United States Patent
Yan et al.

(10) Patent No.: US 9,749,362 B2
(45) Date of Patent: Aug. 29, 2017

(54) METHOD, DEVICE, AND SYSTEM FOR OBTAINING ADDRESS OF SIP REGISTRATION SERVER

(71) Applicant: Huawei Technologies Co., Ltd., Shenzhen, Guangdong (CN)

(72) Inventors: Xiaojun Yan, Nanjing (CN); Wenjun Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 568 days.

(21) Appl. No.: 14/021,522

(22) Filed: Sep. 9, 2013

(65) Prior Publication Data

US 2014/0101285 A1 Apr. 10, 2014

(30) Foreign Application Priority Data

Sep. 10, 2012 (CN) .......................... 2012 1 0332065

(51) Int. Cl.
*H04L 29/06* (2006.01)
*H04L 29/12* (2006.01)

(52) U.S. Cl.
CPC ...... *H04L 65/1006* (2013.01); *H04L 61/1511* (2013.01); *H04L 61/1541* (2013.01); *H04L 61/6013* (2013.01)

(58) Field of Classification Search
CPC ............. H04L 61/1541; H04L 65/1006; H04L 61/6013; H04L 61/1511
See application file for complete search history.

(56) References Cited

U.S. PATENT DOCUMENTS

2002/0188738 A1* 12/2002 Gray ................... H04L 12/2876
709/229
2004/0139170 A1 7/2004 Shen et al.
(Continued)

FOREIGN PATENT DOCUMENTS

| CN | 101047725 A | 10/2007 |
| CN | 101562634 A | 10/2009 |
| CN | 102177685 A | 9/2011 |

OTHER PUBLICATIONS

Dialogic Corporation, Jun. 30, 2012; "DNS Query using SRV record". Retrieved on Nov. 10, 2016 from <https://www.dialogic.com/webhelp/IMG1010/10.5.3/WebHelp/DNS_Query_using_SRV_Record_1053er1.htm>.*

(Continued)

*Primary Examiner* — Dustin Nguyen
*Assistant Examiner* — Juan C Turriate Gastulo
(74) *Attorney, Agent, or Firm* — Leydig, Voit & Mayer, Ltd.

(57) ABSTRACT

The present invention provides a method, device, and system for obtaining an address of a SIP registration server. The method includes: obtaining, by a branch device, a domain name system DNS resource record for specifying the location of service SRV response message; adding information of a SIP local survivable registration server to the DNS SRV response message; and returning the DNS SRV response message to which the information of the SIP local survivable registration server is added to a branch terminal, so that the branch terminal obtains an Internet protocol IP address of the SIP local survivable registration server according to the information of the SIP local survivable registration server in the DNS SRV response message. The solutions provided by the present invention ensure normal working of the branch terminal and saves costs.

16 Claims, 6 Drawing Sheets

(56) References Cited

U.S. PATENT DOCUMENTS

2008/0247381 A1* 10/2008 Bohm ................... H04L 67/104
370/352
2010/0030914 A1 2/2010 Sparks et al.
2010/0332915 A1* 12/2010 Qiu ..................... H04L 65/1046
714/49
2011/0271005 A1* 11/2011 Bharrat ............... H04L 61/1511
709/232

OTHER PUBLICATIONS

IBM, Nov. 30, 2011; "Proxy Registration Model." Retrieved on Nov. 10, 2016 from <https://www-10.lotus.com/ldd/stwiki.nsf/xpDocViewer.xsp?lookupName=Administering+Sametime+Unified+Telephony+8.5.2+Interim+Feature+Release+1+documentation#action=openDocument&res_title=Proxy_Registration_Model_sut852ifr1&content=pdcontent&sa=true>.*
Singh et al., "Failover, Load Sharing and Server Architecture in SIP Telephony," *Computer Communications*, pp. 927-942, issue 30, Elsevier B.V. (2006).
Rosenberg et al., "Session Initiation Protocol (SIP): Locating SIP Servers," Network Working Group Memo, The Internet Society (Jun. 2002).
Gulbrandsen et al., "A DNS RR for specifying the location of services (DNS SRV)," Network Working Group, Request for Comments: 2782, The Internet Society, Reston, Virginia (Feb. 2000).

* cited by examiner

FIG. 1

| Transaction ID (identifier) | Flags (flag) |
|---|---|
| Questions (number of questions) | Answer RRs (number of resource records) |
| Authority RRs (number of authority resource records) | Additional RRs (number of additional resource records) |
| Queries (queries) ||
| Answer (answer) ||
| Authority (authority) ||
| Additional Information (additional record) ||

METHOD, DEVICE, AND SYSTEM FOR OBTAINING ADDRESS OF SIP REGISTRATION SERVER

CROSS-REFERENCE TO RELATED APPLICATION

This application claims priority to Chinese Patent Application No. 201210332065.7, filed on Sep. 10, 2012, which is hereby incorporated by reference in its entirety.

TECHNICAL FIELD

The present invention relates to a communication technology, and in particular, to a method, device, and system for obtaining an address of a session initiation protocol (Session Initiation Protocol, SIP) registration server.

BACKGROUND

With the wide application of an Internet protocol (Internet Protocol, IP) telephony technology, an enterprise or organization extends deployment of IP telephony from a central site to a remote branch office, and deploys a voice server at the central site to manage calls of the remote branch office in a centralized manner. To maintain continuity of basic calls and various voice services, when the communication between the branch office and the central site fails, a voice gateway of the branch office needs to take over the local voice call management function of the voice server of the central site to ensure normal proceeding of the local call of the branch office. After the communication is recovered after a failure, all calls are still processed by the voice server of the central site to implement centralized management of calls.

A SIP local survivable registration service emerges in the above situation. A server providing the SIP local survivable registration service can detect the status of the communication between the branch office and the voice server of the central site in real time, and can actively bear functions of the voice server when a communication failure occurs, for example, basic functions such as user registration and call services, and various voice service functions, which ensures continuity and stability of the communication between the branch office and the central site effectively.

The implementation of the SIP local survivable registration server is based on an assumption that each branch terminal of the branch office can obtain the address of a SIP registration server of the central site and the address of the SIP local survivable registration server of the branch office. In the prior art, generally the address of the SIP registration server of the central site and the address of the SIP local survivable registration server of the branch office are statically configured on each branch terminal of the branch office. However, the static configuration mode generates a large amount of configuration workload; in addition, because the branch office generally supports static configuration of addresses of at most two SIP registration servers, if the central site has an active SIP registration server and a standby SIP registration server, the address of the SIP local survivable registration server of the branch office cannot be statically configured any more. In this case, once the active and standby SIP registration servers of the central site fail, or a branch terminal cannot exchange information with the active and standby SIP registration servers, the branch terminal cannot work normally.

SUMMARY

To solve the problems of a large amount of workload generated by statically configuring IP addresses of SIP registration servers and the limited number of IP addresses of registration servers configured on a branch terminal, the present invention provides a method, device, and system for obtaining an address of a SIP registration server.

In a first aspect, a method for obtaining an address of a SIP registration server is provided, including:

obtaining, by a branch device, a DNS SRV response message;

adding information of a SIP local survivable registration server to the DNS SRV response message; and returning the DNS SRV response message to which the information of the SIP local survivable registration server is added to a branch terminal, so that the branch terminal obtains an Internet protocol IP address of the SIP local survivable registration server according to the information of the SIP local survivable registration server in the DNS SRV response message.

In a first possible implementation of the first aspect, the information of the SIP local survivable registration server includes a domain name of the SIP local survivable registration server; and after the returning the DNS SRV response message to which the information of the SIP local survivable registration server is added to a branch terminal, the method further includes:

receiving, by the branch device, an A query message sent by the branch terminal, where the A query message includes the domain name of the SIP local survivable registration server; and obtaining the IP address of the SIP local survivable registration server according to the domain name of the SIP local survivable registration server, and returning the IP address of the SIP local survivable registration server to the branch terminal.

According to the first possible implementation of the first aspect, in a second possible implementation, before the obtaining the IP address of the SIP local survivable registration server according to the domain name of the SIP local survivable registration server, the method further includes:

storing, by the branch device, correspondence between the domain name of the SIP local survivable registration server and the IP address of the SIP local survivable registration server.

According to the first aspect or the first possible implementation of the first aspect or the second possible implementation of the first aspect, in a third possible implementation, the obtaining, by a branch device, a DNS SRV response message includes:

receiving, by the branch device, a DNS SRV response message returned by a DNS server, where the DNS SRV response message includes an IP address of a SIP registration server of a central site.

According to the third possible implementation of the first aspect, in a fourth possible implementation, the DNS SRV response message further includes a service type, a protocol type, and a domain where the SIP registration server is located; and the adding the information of the SIP local survivable registration server to the DNS SRV response message specifically includes:

when the service type in the DNS SRV response message is the same as a service type of the SIP local survivable registration server, and the protocol type in the DNS SRV response message is the same as a protocol type of the SIP local survivable registration server, and the domain where the SIP registration server is located in the DNS SRV response message is the same as a domain where the SIP local survivable registration server is located, adding the information of the SIP local survivable registration server to the DNS SRV response message.

According to the first aspect or the first possible implementation of the first aspect or the second possible implementation of the first aspect, in a fifth possible implementation, the obtaining, by a branch device, a DNS SRV response message includes:

if the branch device detects a link failure between the branch device and a DNS server, or does not receive a response from the DNS server within a preset duration, constructing, by the branch device, the DNS SRV response message.

In a second aspect, a method for obtaining an address of a SIP registration server is provided, including:

receiving, by a branch terminal, a DNS resource record for specifying the location of service SRV response message sent by a branch device to which the branch terminal belongs, where the DNS SRV response message includes information of a SIP local survivable registration server; and obtaining an Internet protocol IP address of the SIP local survivable registration server according to the information of the SIP local survivable registration server in the DNS SRV response message.

In a first possible implementation of the second aspect, the information of the SIP local survivable registration server includes a domain name of the SIP local survivable registration server; and the obtaining an Internet protocol IP address of the SIP local survivable registration server according to the information of the SIP local survivable registration server in the DNS SRV response message includes:

sending an A query message to the branch device, where the A query message includes the domain name of the SIP local survivable registration server; and receiving the IP address of the SIP local survivable registration server which is returned by the branch device according to the domain name of the SIP local survivable registration server.

According to the first possible implementation of the second aspect, in a second possible implementation, the information of the SIP local survivable registration server further includes a port, a priority, and a weight of the SIP local survivable registration server; the DNS SRV response message further includes an address, a port, a priority, and a weight of a SIP registration server of a central site to which the branch device belongs; and after the branch terminal registers with the address and port of the SIP registration server successfully or registers with the address and port of the SIP local survivable registration server successfully, the method further includes:

calculating a registration lifecycle of the branch terminal; and if the registration lifecycle of the branch terminal expires, sending a SIP registration request to a corresponding SIP registration server according to descending order of priorities and weights.

According to the second aspect, in a third possible implementation, the information of the SIP local survivable registration server includes the IP address of the SIP local survivable registration server; and the obtaining an Internet protocol IP address of the SIP local survivable registration server according to the information of the SIP local survivable registration server in the DNS SRV response message includes:

obtaining the IP address of the SIP local survivable registration server from an additional record part of the DNS SRV response message.

In a third aspect, a branch device is provided, including:

a first obtaining module, configured to obtain a domain name system DNS resource record for specifying the location of service SRV response message;

a processing module, configured to add information of a SIP local survivable registration server to the DNS SRV response message; and a sending module, configured to return the DNS SRV response message to which the information of the SIP local survivable registration server is added to a branch terminal, so that the branch terminal obtains an Internet protocol IP address of the SIP local survivable registration server according to the information of the SIP local survivable registration server in the DNS SRV response message.

In a first possible implementation of the third aspect, the information of the SIP local survivable registration server includes a domain name of the SIP local survivable registration server;

the branch device further includes:

a receiving module, configured to receive an A query message sent by the branch terminal, where the A query message includes the domain name of the SIP local survivable registration server; and a second obtaining module, configured to obtain the IP address of the SIP local survivable registration server according to the domain name of the SIP local survivable registration server; and the sending module is further configured to return the IP address of the SIP local survivable registration server to the branch terminal.

According to the first possible implementation of the third aspect, in a second possible implementation, the branch device further includes:

a storing module, configured to store correspondence between the domain name of the SIP local survivable registration server and the IP address of the SIP local survivable registration server.

According to the third aspect or the first possible implementation of the third aspect or the second possible implementation of the third aspect, in a third implementation, the first obtaining module is specifically configured to receive a DNS SRV response message returned by a DNS server, where the DNS SRV response message includes an IP address of a SIP registration server of a central site to which the branch device belongs.

According to the third implementation of the third aspect, in a fourth implementation, the DNS SRV response message further includes a service type, a protocol type, and a domain where the SIP registration server is located; and the processing module is specifically configured to: when the service type in the DNS SRV response message is the same as a service type of the SIP local survivable registration server, and the protocol type in the DNS SRV response message is the same as a protocol type of the SIP local survivable registration server, and the domain where the SIP registration server is located in the DNS SRV response message is the same as a domain where the SIP local survivable registration server is located, add the information of the SIP local survivable registration server to the DNS SRV response message.

According to the third aspect or the first possible implementation of the third aspect or the second possible implementation of the third aspect, in a fifth implementation, the first obtaining module is specifically configured to: if the branch device detects a link failure between the branch device and a DNS server, or does not receive a response from the DNS server within a preset duration, construct the DNS SRV response message.

In a fourth aspect, a branch terminal is provided, including:

a receiving module, configured to receive a DNS resource record for specifying the location of service SRV response message sent by a branch device to which the branch terminal belongs, where the DNS SRV response message includes information of a SIP local survivable registration server; and an obtaining module, configured to obtain an Internet protocol IP address of the SIP local survivable registration server according to the information of the SIP local survivable registration server in the DNS SRV response message.

In a first possible implementation of the fourth aspect, the information of the SIP local survivable registration server received by the receiving module includes a domain name of the SIP local survivable registration server; and the obtaining module includes:

a sending unit, configured to send an A query message to the branch device, where the A query message includes the domain name of the SIP local survivable registration server; and a receiving unit, configured to receive the IP address of the SIP local survivable registration server which is returned by the branch device according to the domain name of the SIP local survivable registration server.

According to the first possible implementation of the fourth aspect, in a second possible implementation, the information of the SIP local survivable registration server received by the receiving module further includes a port, a priority, and a weight of the SIP local survivable registration server; the DNS SRV response message further includes an address, a port, a priority, and a weight of a SIP registration server of a central site to which the branch device belongs; and the branch terminal further includes:

a registering module, configured to register with the address and port of the SIP registration server of the central site, and if the registration fails, register with the address and port of the SIP local survivable registration server; and a calculating module, configured to: if the registration with the address and port of the SIP registration server is successful or the registration with the address and port of the SIP local survivable registration server is successful, calculate a registration lifecycle of the branch terminal; and if the registration lifecycle of the branch terminal expires, send a SIP registration request to a corresponding SIP registration server according to descending order of priorities and weights.

According to the fourth aspect, in a third possible implementation, the information of the SIP local survivable registration server received by the receiving module includes the IP address of the SIP local survivable registration server; and the obtaining module is configured to obtain the IP address of the SIP local survivable registration server from an additional record part of the DNS SRV response message.

In a fifth aspect, a network system is provided, including: the branch device in the third aspect and implementations thereof, and the branch terminal in the fourth aspect and implementations thereof.

The technical effects of the present invention are as follows: The information of the SIP local survivable registration server is carried in the DNS SRV response message and sent to the branch terminal, so that the branch terminal may obtain the IP address of the SIP local survivable registration server from the received DNS SRV response message; in this way, a local registration service is provided when the branch terminal fails to obtain the SIP registration server of the central site. The present invention provides a simple and feasible solution. The IP address of the SIP registration server can be obtained without requiring any additional device, without requiring the branch terminal to support the configuration of IP addresses of multiple SIP registration servers, without requiring to configure the DNS server with address information of the SIP local survivable registration server of each branch device, and without increasing messages transferring between the branch device and the SIP registration servers of the central site, and between the branch device and the DNS server. Therefore, normal working of the branch terminal is ensured and costs are saved.

DESCRIPTION OF EMBODIMENTS

It should be noted that for a central site, only one SIP registration server may be deployed, or one active SIP registration server and one or more standby SIP registration servers may be deployed. Of course, those skilled in the art may understand that if only one SIP registration server is deployed for the central site, information and processing of a standby SIP registration server are not involved. In the embodiments of the present invention, one active SIP registration server and one standby SIP registration server are deployed for the central site, which is used as an example for description but is not construed as a limitation on the present invention.

Figure 1:
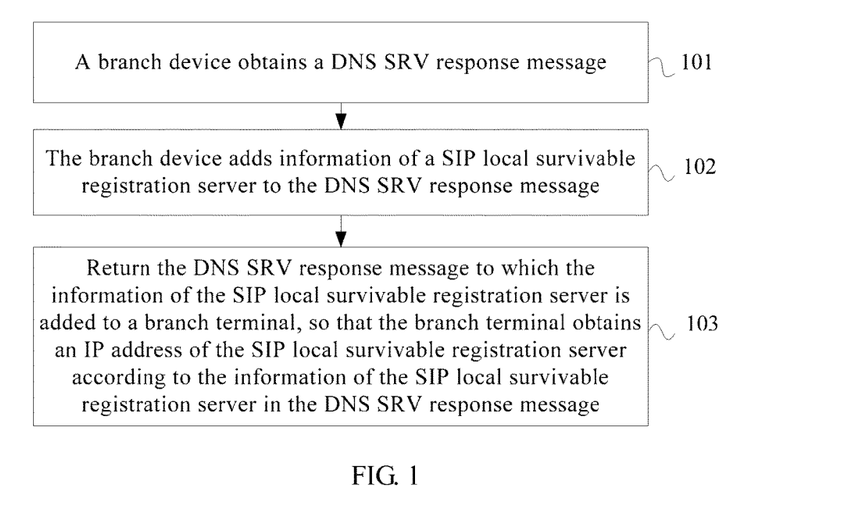
FIG. 1 is a flowchart of a method for obtaining an address of a SIP registration server according to an embodiment of the present invention.

FIG. 1 is a flowchart of a method for obtaining an address of a SIP registration server according to an embodiment of the present invention. As shown in FIG. 1, the method includes the following:

101. A branch device obtains a domain name system (Domain Name System, DNS) resource record for specifying the location of service (Resource Record for Specifying the Location of Service, SRV) response message.

102. The branch device adds information of a SIP local survivable registration server to the DNS SRV response message.

103. The branch device returns the DNS SRV response message to which the information of the SIP local survivable registration server is added to a branch terminal, so that the branch terminal obtains an IP address of the SIP local survivable registration server according to the information of the SIP local survivable registration server in the DNS SRV response message.

According to the solution provided by the embodiment of the present invention, the information of the SIP local survivable registration server is carried in the DNS SRV response message and sent to the branch terminal, so that the branch terminal may obtain the IP address of the SIP local survivable registration server from the received DNS SRV response message; in this way, the branch terminal may obtain a normal registration service through the SIP local survivable registration server when the branch terminal fails to obtain the SIP registration server of a central site.

The present invention provides a simple and feasible solution. The IP address of the SIP registration server can be obtained without requiring any additional device, without requiring the branch terminal to support the configuration of IP addresses of multiple SIP registration servers, without requiring to configure the DNS server with address information of the SIP local survivable registration server of each branch device, and without additionally increasing the messages transferring between the branch device and the SIP registration servers of the central site, and between the branch device and the DNS server. Therefore, normal working of the branch terminal is ensured and costs are saved.

The branch device provided by the embodiment of the present invention may be a branch router that enables a service of the SIP local survivable registration server and a DNS proxy (Proxy) service, or may be a DNS proxy server that enables the service of the SIP local survivable registration server, or of course may be other devices of a branch office. That is, the branch device provided by the embodiment of the present invention is not only a SIP local survivable registration server of the branch office but also a DNS proxy responsible for implementing information transfer between the branch terminal and the DNS server. The branch terminal may be a common terminal device of the branch office, such as a SIP phone.

Figure 2:
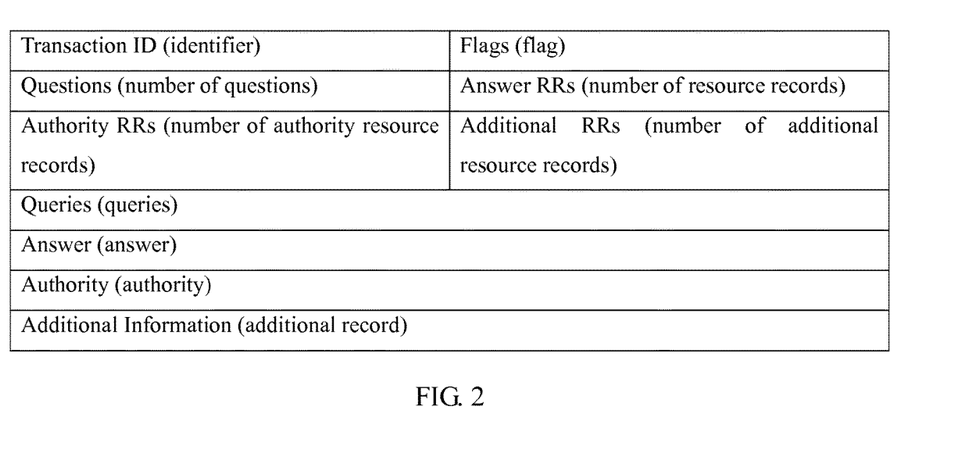
FIG. 2 is a packet format of a DNS SRV response message.

The packet format of the DNS SRV response message may be as shown in FIG. 2, where the identifier (Transaction ID), flags (Flags), number of questions (Questions), number of resource records (Answer RRs), number of authority resource records (Authority RRs), and number of additional resource records (Additional RRs) belong to the header of a packet and occupy 12 bytes. The queries (Queries), answer (Answer), authority (Authority), and additional record (Additional Information) are present only in the payload of the packet, and are all in a resource record (Resource Record) form.

In an implementation, the method for the branch device to obtain the DNS SRV response message in step 101 may include, but not limited to, the following methods:

In one method, the DNS SRV response message is a response sent by the DNS server in response to a DNS SRV query request sent by the branch terminal. The DNS SRV query request is sent by the branch terminal during startup to the branch device acting as a DNS proxy, and then is forwarded by the branch device to a DNS server. Then, the DNS server returns a DNS SRV response message to the branch device.

In another method, if the branch device detects a link failure between the branch device and a DNS server after receiving a DNS SRV query request message sent by the branch terminal, or does not receive, within a preset duration, a DNS SRV response message returned by the DNS server, the branch device directly constructs the DNS SRV response message to ensure normal working of the branch terminal.

In another implementation, in step 102, the information of the SIP local survivable registration server may include a domain name of the SIP local survivable registration server, and may also include a port, weight, and priority of the SIP local survivable registration server; the domain name, port, weight, and priority of the SIP local survivable registration server, and so on may be carried in the answer (Answer) part of the DNS SRV response message. Generally, the SIP local survivable registration server may provide a specified port to the branch terminal for SIP registration. The weight and priority of the SIP local survivable registration server are lower than the weight and priority of the SIP registration server of the central site.

Further, the information of the SIP local survivable registration server may include the IP address of the SIP local survivable registration server, where the IP address may be carried in the additional record (Additional Information) part of the DNS SRV response message.

Figure 3:
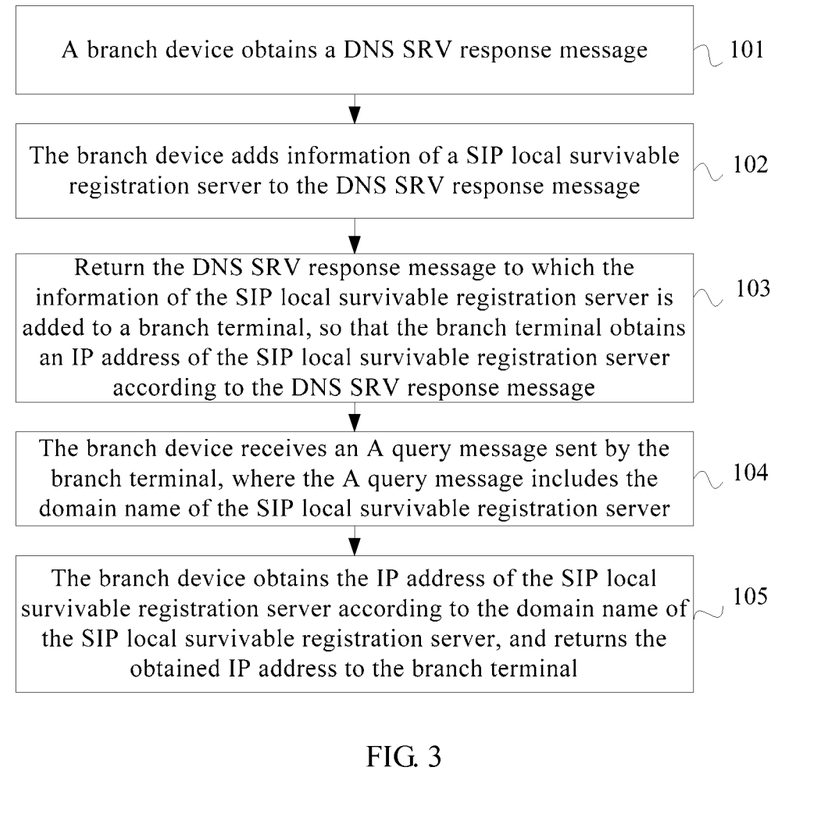
FIG. 3 is a flowchart of another method for obtaining an address of a SIP registration server according to an embodiment of the present invention.

FIG. 3 is a flowchart of another method for obtaining an address of a SIP registration server according to an embodiment of the present invention. After step 103, the method may further include the following:

104. The branch device receives an A query message sent by the branch terminal, where the A query message includes the domain name of the SIP local survivable registration server.

105. The branch device obtains the IP address of the SIP local survivable registration server according to the domain name of the SIP local survivable registration server, and returns the obtained IP address to the branch terminal.

The A query message mentioned in step 104 may be understood as a query message from which the IP address can be directly obtained according to the domain name, for example, a domain name resolution request message.

In an implementation, in the method for obtaining an address of a SIP registration server according to the embodiment of the present invention, the SIP local survivable registration server may store correspondence between the domain name of the SIP local survivable registration server and the IP address of the SIP local survivable registration server into its own DNS cache, and when receiving the A query message, search for the correspondence in its own DNS cache according to the domain name of the SIP local survivable registration server in the A query message to obtain an IP address corresponding to the domain name.

On the basis of the above implementations, it should be noted that in the DNS SRV response message returned by the DNS server, the IP address of the SIP registration server of the central site to which the branch device belongs is returned to the branch device, and the information such as the domain name, port, priority, and weight of the SIP registration server of the central site may be carried together in the DNS SRV response message and returned to the branch device.

After receiving the DNS SRV response message, the branch device may further store correspondence between the domain name and the IP address of the SIP registration server of the central site. When the branch device receives the A query message from the branch terminal requesting the IP address of the SIP registration server of the central site, because the correspondence between the domain name and the address is pre-stored, the branch device may not request the DNS server any longer, but directly act as a DNS server to respond to the A query message. If the correspondence between the domain name and the address is not pre-stored, or the correspondence between the domain name and the address cannot be found, the branch device still works as a DNS proxy.

In an implementation, the DNS SRV response message returned by the DNS server to the branch device may further include a service type, a protocol type, and a domain where the SIP registration server of the central site is located; in this case, step 102 may specifically include: when the service type in the DNS SRV response message is the same as a service type of the SIP local survivable registration server, and the protocol type in the DNS SRV response message is the same as a protocol type of the SIP local survivable registration server, and the domain where the SIP registration server is located in the DNS SRV response message is the same as a domain where the SIP local survivable registration server is located, executing the step of adding the information of the SIP local survivable registration server to the DNS SRV response message. If any item is not matched, it is unnecessary to process the DNS SRV response message, thereby effectively ensuring work efficiency and accuracy of the branch device. The service type and protocol type, and the domain where the SIP registration server of the central site is located (for example, it may be .huawei.com) may be carried in the Additional Information part of the DNS SRV response message. Herein, it should be noted that the service type may be, but not limited to, SIP and SIPS; the protocol type may be, but not limited to, a transmission control protocol (Transmission Control Protocol, TCP), a user datagram protocol (User Datagram Protocol, UDP), and a stream control transmission protocol (Stream Control Transmission Protocol, SCTP).

In the method for obtaining an address of a SIP registration server according to the embodiment of the present invention, the DNS SRV response message returned by the branch device to the branch terminal includes information of the SIP local survivable registration server, so that the branch terminal may obtain the IP address of the SIP local survivable registration server according to the information of the SIP local survivable registration server in the received DNS SRV response message. The IP address of the SIP registration server can be obtained without increasing the interaction mechanisms and messages between the branch device and the SIP registration servers of the central site, and between the branch device and the DNS server, without requiring any additional device, without requiring the branch terminal to support the configuration of IP addresses of multiple SIP registration servers, and without requiring to configure the DNS server with the IP address of the SIP local survivable registration server of each branch device. Therefore, normal working of the branch terminal is ensured and costs are saved.

Figure 4:
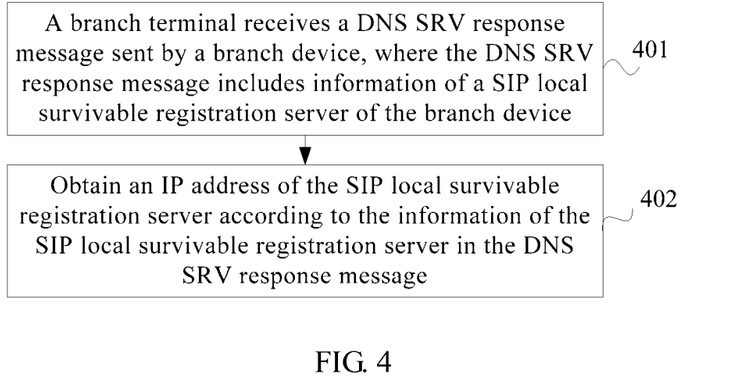
FIG. 4 is a flowchart of still another method for obtaining an address of a SIP registration server according to an embodiment of the present invention.

The above embodiments all describe the technical solution from the perspective of a branch device, and the following describes the technical solution from the perspective of a branch terminal. FIG. 4 is a flowchart of still another method for obtaining an address of a SIP registration server according to an embodiment of the present invention. As shown in FIG. 4, the method may include the following:

401. A branch terminal receives a DNS SRV response message sent by a branch device to which the branch terminal belongs, where the DNS SRV response message includes information of a SIP local survivable registration server of the branch device.

402. Obtain an IP address of the SIP local survivable registration server according to the information of the SIP local survivable registration server in the DNS SRV response message.

In an implementation, before step 401, the branch terminal is started, and needs to obtain the domain where the SIP registration server of a central site is located and the IP address of a DNS server.

The method for the branch terminal to obtain the domain where the SIP registration server of the central site is located may include, but not limited to, the following means: One means is direct static configuration on the branch terminal; the other means is pre-configuring, on a DHCP server, the domain where the SIP registration server of the central site is located, and dynamically obtaining, by the branch terminal by using DHCP Option120, the domain where the SIP registration server of the central site is located.

The method for the branch terminal to obtain the IP address of the DNS server may include, but not limited to, direct static configuration on the branch terminal; or sending, by the branch terminal, a DHCP request, for example, DHCP Option6. In this embodiment, because the branch device acts as a DNS proxy, what is returned by the branch device to the branch terminal is the IP address of the branch device itself.

In another implementation, the information of the SIP local survivable registration server includes a domain name of the SIP local survivable registration server, where the domain name of the SIP local survivable registration server may be carried in the answer (Answer) part of the DNS SRV response message; step 402 may specifically include: sending an A query message to the branch device, where the A query message includes the domain name of the SIP local survivable registration server; and receiving the IP address of the SIP local survivable registration server which is returned by the branch device according to the domain name of the SIP local survivable registration server.

The information of the SIP local survivable registration server may further include the IP address of the SIP local survivable registration server, where the IP address of the SIP local survivable registration server is carried in the Additional Information part in the DNS SRV response message; step 402 may specifically include:

obtaining the IP address of the SIP local survivable registration server from the Additional Information part in the DNS SRV response message.

On the basis of the above implementations, the information of the SIP local survivable registration server may further include a port, priority, and weight of the SIP local survivable registration server; the DNS SRV response message further includes an address, port, priority, and weight of the SIP registration server of the central site to which the branch device belongs. Generally, if the central site includes not only an active SIP registration server but also a standby SIP registration server, the priority and weight of the active SIP registration server of the central site are higher than the priority and weight of the standby SIP registration server; the priority and weight of the standby SIP registration server are higher than the priority and weight of the SIP local survivable registration server. That is, the branch terminal first sends a SIP registration request to the address and port of the active SIP registration server; if sending the registration request to the address and port of the active SIP registration server fails, sends a SIP registration request to the address and port of the standby SIP registration server; and if sending the registration request to the address and port of the standby SIP registration server fails, sends a SIP registration request to the address and port of the SIP local survivable registration server.

Figure 5:
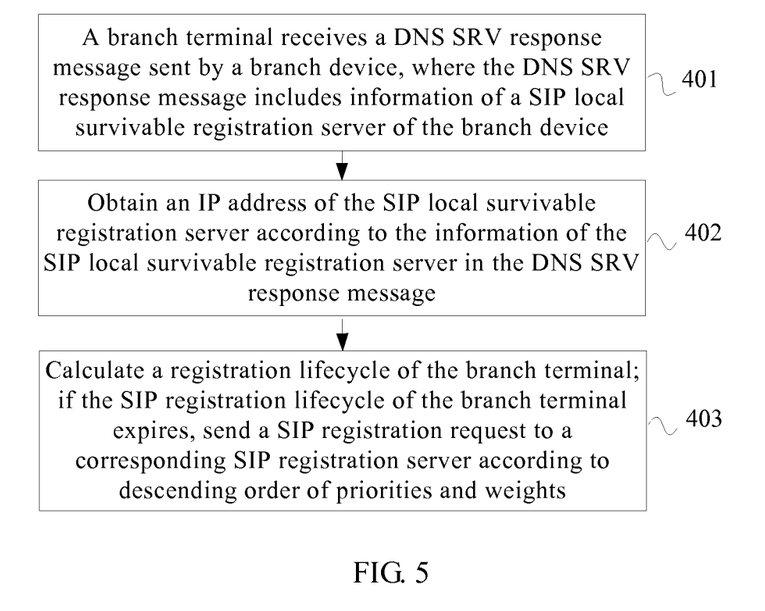
FIG. 5 is a flowchart of still another method for obtaining an address of a SIP registration server according to an embodiment of the present invention.

After the branch terminal registers with the address and port of the SIP registration server of the central site successfully, or registers with the address and port of the SIP local survivable registration server of the branch device successfully, as shown FIG. 5, which is a flowchart of still another method for obtaining an address of a SIP registration server according to an embodiment of the present invention, the method further includes:

403. Calculate a registration lifecycle of the branch terminal; and if the SIP registration lifecycle of the branch terminal expires, send a SIP registration request to a corresponding SIP registration server according to descending order of priorities and weights.

Figure 6:
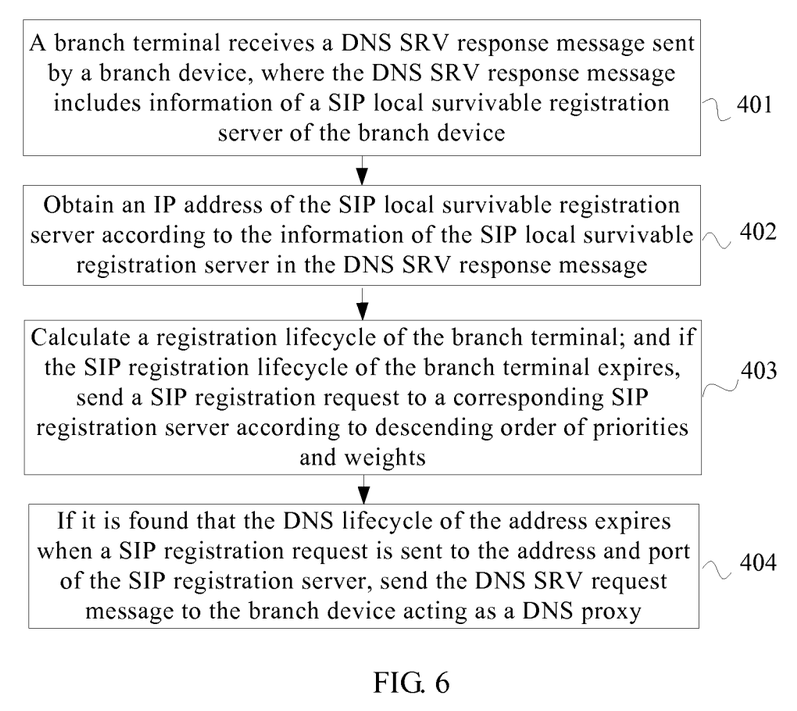
FIG. 6 is a flowchart of still another method for obtaining an address of a SIP registration server according to an embodiment of the present invention.

That is, if the SIP registration lifecycle of the branch terminal expires, the branch terminal first sends a SIP registration request to the address and port of the active SIP registration server; if sending the registration request to the address and port of the active SIP registration server fails, sends a SIP registration request to the address and port of the standby SIP registration server; and if sending the registration request to the address and port of the standby SIP registration server fails, sends a SIP registration request to the address and port of the SIP local survivable registration server. Further, as shown in FIG. 6, which is a flowchart of still another method for obtaining an address of a SIP registration server according to an embodiment of the present invention, the method may further include:

404. If it is found that the DNS lifecycle of the address of the SIP registration server expires when a SIP registration request is sent to an address and a port of each SIP registration server in step 403, resend the DNS SRV query request message to the branch device acting as a DNS proxy.

According to the solution provided by the embodiment of the present invention, the branch terminal obtains the address of the SIP local survivable registration server from the DNS SRV response message, so that the branch terminal may obtain a normal registration service through the SIP local survivable registration server when the branch terminal fails to obtain the SIP registration server of the central site. The present invention provides a simple and feasible solution. The IP address of the SIP registration server can be obtained without requiring any additional device, without requiring the branch terminal to support the configuration of IP addresses of multiple SIP registration servers, without requiring to configure the DNS server with address information of the SIP local survivable registration server of each branch device, and without increasing messages transferring between the branch device and the SIP registration servers of the central site, and between the branch device and the DNS server. Therefore, normal working of the branch terminal is ensured and costs are saved.

Persons of ordinary skill in the art may understand that all or a part of the steps in the foregoing method embodiments may be implemented by hardware instructed by a program. The program may be stored in a computer-readable storage medium. When the program runs, the steps of the method according to the embodiments are performed. The storage medium may be any medium capable of storing program codes, such as a ROM, a RAM, a magnetic disk, or a CD-ROM.

Figure 7:
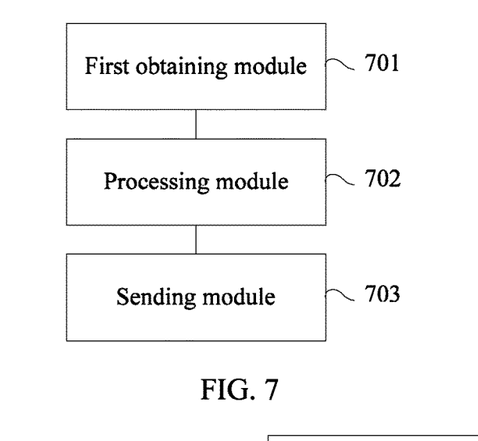
FIG. 7 is a schematic structural diagram of a branch device according to an embodiment of the present invention.

FIG. 7 is a schematic structural diagram of a branch device according to an embodiment of the present invention. The branch device provided by this embodiment is one of the executors in the above method embodiments. For the specific method flowchart, reference may be made to the above method embodiments, and details are not repeated herein. The branch device provided by the embodiment of the present invention may be a branch router that enables a service of the SIP local survivable registration server and a DNS proxy (Proxy) service, or may be a DNS proxy server that enables the service of the SIP local survivable registration server, or of course may be other devices of a branch office. That is, the branch device provided by the embodiment of the present invention is not only a SIP local survivable registration server of the branch office but also a DNS proxy responsible for implementing information transfer between the branch terminal and a DNS server.

As shown in FIG. 7, the branch device includes: a first obtaining module 701, a processing module 702, and a sending module 703. The first obtaining module 701 is configured to obtain a domain name system DNS resource record for specifying the location of service SRV response message; the processing module 702 is configured to add information of a SIP local survivable registration server to the DNS SRV response message; and the sending module 703 is configured to return the DNS SRV response message to which the information of the SIP local survivable registration server is added to a branch terminal, so that the branch terminal obtains an Internet protocol IP address of the SIP local survivable registration server according to the information of the SIP local survivable registration server in the DNS SRV response message.

Figure 8:
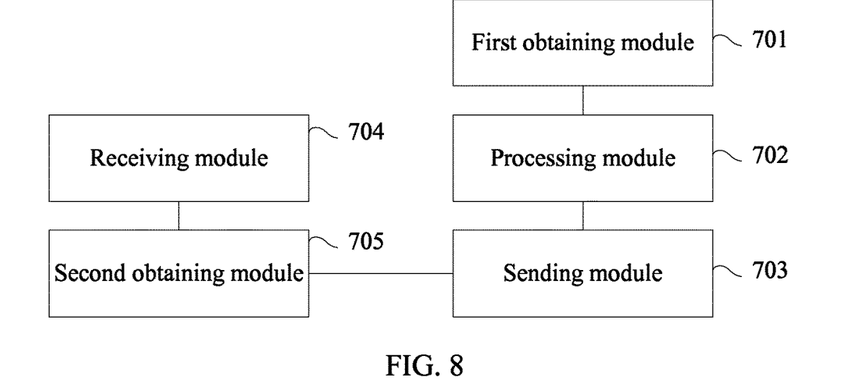
FIG. 8 is another schematic structural diagram of the branch device according to an embodiment of the present invention.

FIG. 8 is another schematic structural diagram of the branch device according to an embodiment of the present invention in an implementation. As shown in FIG. 8, the information of the SIP local survivable registration server includes a domain name of the SIP local survivable registration server; the branch device further includes: a receiving module 704, configured to receive an A query message sent by the branch terminal, where the A query message includes the domain name of the SIP local survivable registration server; and a second obtaining module 705, configured to obtain the IP address of the SIP local survivable registration server according to the domain name of the SIP local survivable registration server; and the sending module 703 is further configured to return the IP address of the SIP local survivable registration server to the branch terminal.

It should be noted that the information of the SIP local survivable registration server may further include a port, weight, and priority of the SIP local survivable registration server in addition to the domain name; the domain name, port, weight, and priority of the SIP local survivable registration server, and so on may be carried in the answer (Answer) part of the DNS SRV response message; correspondingly, the processing module 702 is specifically configured to add information such as the domain name, port, weight, and priority of the SIP local survivable registration server to the answer (Answer) part of the DNS SRV response message. Generally, the SIP local survivable registration server provides a specified port to the branch terminal for SIP registration. The weight and priority of the SIP local survivable registration server are lower than the weight and priority of the SIP registration server of the central site.

Figure 9:
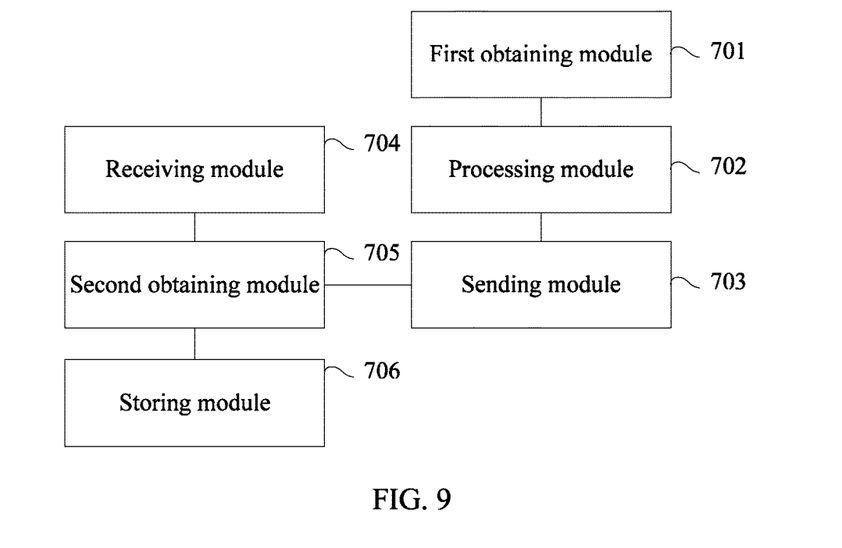
FIG. 9 is still another schematic structural diagram of the branch device according to an embodiment of the present invention.

On the basis of the implementation shown in FIG. 8, FIG. 9 is still another schematic structural diagram of the branch device according to an embodiment of the present invention. The branch device may further include: a storing module 706, configured to store correspondence between the domain name of the SIP local survivable registration server and the IP address of the SIP local survivable registration server. Generally, the SIP local survivable registration server may store the correspondence between the domain name of the SIP local survivable registration server and the IP address of the SIP local survivable registration server into its own DNS cache, and when receiving the A query message, search for the correspondence in its own DNS cache according to the domain name of the SIP local survivable registration server in the A query message to obtain an IP address corresponding to the domain name.

In an implementation, the information of the SIP local survivable registration server further includes the IP address of the SIP local survivable registration server; the processing module 702 is specifically further configured to include the IP address of the SIP local survivable registration server into the additional record part of the DNS SRV response message.

On the basis of any one of the above implementations, the first obtaining module 701 is specifically configured to: receive a DNS SRV response message returned by a DNS server, where the DNS SRV response message includes an IP address of a SIP registration server of a central site to which the branch device belongs.

The DNS SRV response message further includes a service type, a protocol type, and a domain where the SIP registration server of the central site is located; correspondingly, the processing module 702 is specifically configured to: when the service type in the DNS SRV response message is the same as a service type of the SIP local survivable registration server, and the protocol type in the DNS SRV response message is the same as a protocol type of the SIP local survivable registration server, and the domain where the SIP registration server is located in the DNS SRV response message is the same as a domain where the SIP local survivable registration server is located, add the information of the SIP local survivable registration server to the DNS SRV response message.

On the basis of any one of the above embodiments, in an implementation, the first obtaining module 701 is specifically configured to: if the branch device detects a link failure between the branch device and the DNS server, or does not receive a response from the DNS server within a preset duration, construct the DNS SRV response message.

Figure 10:
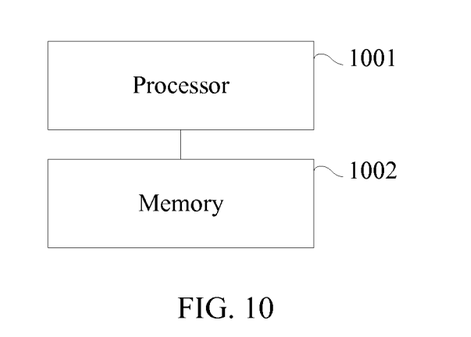
FIG. 10 is a schematic structural diagram of a branch device according to an embodiment of the present invention.

FIG. 10 is a schematic structural diagram of a branch device according to an embodiment of the present invention. The branch device is one of the executors in the above method embodiments, and the branch device includes: a memory 1002 and a processor 1001 communicating with the memory 1002, where the memory 1002 stores program codes, where the program codes include operation instructions of a computer. The processor 1001 executes the program codes, and is configured to:

obtain a domain name system DNS resource record for specifying the location of service SRV response message;

add information of a SIP local survivable registration server to the DNS SRV response message; and return the DNS SRV response message to which the information of the SIP local survivable registration server is added to a branch terminal, so that the branch terminal obtains an Internet protocol IP address of the SIP local survivable registration server according to the information of the SIP local survivable registration server in the DNS SRV response message.

In an implementation, the information of the SIP local survivable registration server may include the domain name of the SIP local survivable registration server, and may further include information such as a domain name, port, priority, and weight of the SIP local survivable registration server.

The processor 1001 executes the program codes, and is further configured to:

receive an A query message sent by the branch terminal, where the A query message includes the domain name of the SIP local survivable registration server;

obtain the IP address of the SIP local survivable registration server according to the domain name of the SIP local survivable registration server; and return the IP address of the SIP local survivable registration server to the branch terminal.

The memory 1002 is further configured to store correspondence between the domain name of the SIP local survivable registration server and the IP address of the SIP local survivable registration server.

In another implementation, the information of the SIP local survivable registration server further includes the IP address of the SIP local survivable registration server; the processor 1001 executes the program codes, and is further configured to carry the IP address of the SIP local survivable registration server into the additional record part of the DNS SRV response message.

The DNS SRV response message includes an IP address of a SIP registration server of a central site to which the branch device belongs; and may further include information such as a domain name, port, priority, and weight of the SIP registration server of the central site. The DNS SRV response message further includes a service type, a protocol type, and a domain where the SIP registration server of the central site is located; the processor 1001 executes the program codes, and is further configured to: when the service type in the DNS SRV response message is the same as a service type of the SIP local survivable registration server, and the protocol type in the DNS SRV response message is the same as a protocol type of the SIP local survivable registration server, and the domain where the SIP registration server is located in the DNS SRV response message is the same as a domain where the SIP local survivable registration server is located, add the information of the SIP local survivable registration server to the DNS SRV response message.

On the basis of any one of the above implementations, the processor 1001 executes the program codes, and is further configured to: if it is detected a link failure between the branch device and a DNS server, or a response from the DNS server is not received within a preset duration, construct the DNS SRV response message; and add the information of the SIP local survivable registration server to the DNS SRV response message.

In this embodiment, the processor of the branch device executes the operation instructions in the memory and carries the information of the SIP local survivable registration server into the DNS SRV response message, so that the branch terminal may obtain the IP address of the SIP local survivable registration server according to the information of the SIP local survivable registration server in the received DNS SRV response message. The IP address of the SIP registration server can be obtained without increasing the interaction mechanisms and messages between the branch device and the SIP registration servers of the central site, and between the branch device and the DNS server, without requiring any additional device, without requiring the branch terminal to support the configuration of IP addresses of multiple SIP registration servers, and without requiring to configure the DNS server with the IP address of the SIP local survivable registration server of each branch device. Therefore, normal working of the branch terminal is ensured and costs are saved.

Figure 11:
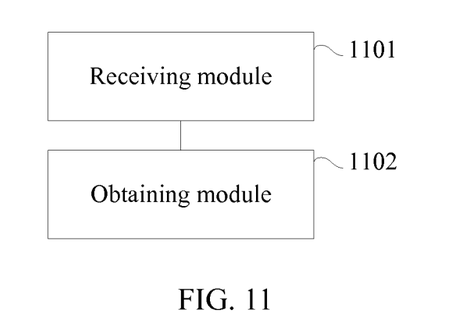
FIG. 11 is a schematic structural diagram of a branch terminal according to an embodiment of the present invention.

FIG. 11 is a schematic structural diagram of a branch terminal according to an embodiment of the present invention. The branch terminal is one of the executors in the above method embodiments. For the specific method flowchart, reference may be made to the above method embodiments, and details are not repeated herein. As shown in FIG. 11, the branch terminal may include: a receiving module 1101 and an obtaining module 1102, where the receiving module 1101 is configured to receive a DNS resource record for specifying the location of service SRV response message sent by a branch device to which the branch terminal belongs, where the DNS SRV response message includes information of a SIP local survivable registration server; and the obtaining module 1102 is configured to obtain an Internet protocol IP address of the SIP local survivable registration server according to the information of the SIP local survivable registration server in the DNS SRV response message.

In an implementation, the information of the SIP local survivable registration server received by the receiving module includes a domain name of the SIP local survivable registration server; the obtaining module 1102 includes: a sending unit, configured to send an A query message to the branch device, where the A query message includes the domain name of the SIP local survivable registration server; and a receiving unit, configured to receive the IP address of the SIP local survivable registration server which is returned by the branch device according to the domain name of the SIP local survivable registration server.

Figure 12:
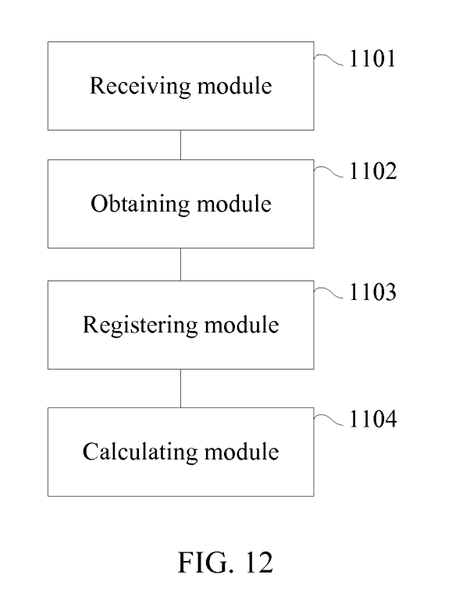
FIG. 12 is another schematic structural diagram of the branch terminal according to an embodiment of the present invention.

On the basis of the above implementation, FIG. 12 is another schematic structural diagram of the branch terminal according to an embodiment of the present invention. The information of the SIP local survivable registration server received by the receiving module 1101 further includes a port, priority, and weight of the SIP local survivable registration server; the DNS SRV response message further includes an address, port, priority, and weight of a SIP registration server of a central site; and the branch terminal further includes:

a registering module 1103, configured to register with the address and port of the SIP registration server of the central site, and if the registration fails, register with the address and port of the SIP local survivable registration server; that is, the registering module 1103 first sends a SIP registration request to the address and port of an active SIP registration server; if sending the registration request to the address and port of the active SIP registration server fails, sends a SIP registration request to the address and port of a standby SIP registration server; and if sending the registration request to the address and port of the standby SIP registration server fails, sends a SIP registration request to the address and port of the SIP local survivable registration server; and a calculating module 1104, configured to: if the registration with the address and port of the SIP registration server of the central site is successful or the registration with the address and port of the SIP local survivable registration server is successful, calculate a registration lifecycle of the branch terminal; and if the registration lifecycle of the branch terminal expires, send a SIP registration request to a corresponding SIP registration server according to descending order of priorities and weights.

In an implementation, the information of the SIP local survivable registration server received by the receiving module 1101 includes the IP address of the SIP local survivable registration server; and the obtaining module 1102 is specifically configured to read the additional record part of the DNS SRV response message to obtain the IP address of the SIP local survivable registration server.

Figure 13:
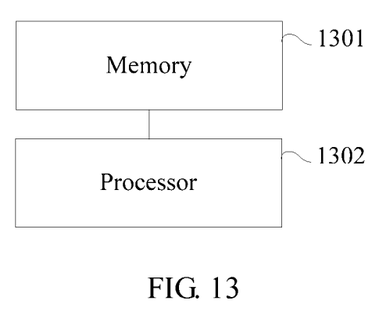
FIG. 13 is a schematic structural diagram of a branch terminal according to an embodiment of the present invention.

FIG. 13 is a schematic structural diagram of a branch terminal according to an embodiment of the present invention. The branch terminal is one of the executors in the above method embodiments, and as shown in FIG. 13, the branch terminal includes: a memory 1301 and a processor 1302 communicating with the memory 1301, where the memory 1301 stores program codes, where the program codes include operation instructions of a computer. The processor 1302 executes the program codes, and is configured to:

receive a DNS SRV response message sent by a branch device to which the branch terminal belongs, where the DNS SRV response message includes information of a SIP local survivable registration server; and obtain an Internet protocol IP address of the SIP local survivable registration server according to the information of the SIP local survivable registration server in the DNS SRV response message.

In an implementation, the information of the SIP local survivable registration server includes a domain name of the SIP local survivable registration server; the processor 1302 executes the program codes, and is further configured to: send an A query message to the branch device, where the A query message includes the domain name of the SIP local survivable registration server; and receive the IP address of the SIP local survivable registration server which is returned by the branch device according to the domain name of the SIP local survivable registration server.

Further, the information of the SIP local survivable registration server further includes a port, priority, and weight of the SIP local survivable registration server; the DNS SRV response message further includes an address, port, priority, and weight of a SIP registration server of a central site to which the branch device belongs; and the processor 1302 executes the program codes, and is further configured to:

register with the address and port of the SIP registration server of the central site, and if the registration fails, register with the address and port of the SIP local survivable registration server;

if the registration with the address and port of the SIP registration server of the central site is successful or the registration with the address and port of the SIP local survivable registration server is successful, calculate a registration lifecycle of the branch terminal; and if the registration lifecycle of the branch terminal expires, send a SIP registration request to a corresponding SIP registration server according to descending order of priorities and weights.

In an implementation, the information of the SIP local survivable registration server includes the IP address of the SIP local survivable registration server; the processor 1302 executes the program codes, and is further configured to read the additional record part of the DNS SRV response message to obtain the IP address of the SIP local survivable registration server.

In this embodiment, the processor of the branch terminal executes the operation instructions in the memory, and obtains the address of the SIP local survivable registration server from the DNS SRV response message, so that a normal registration service may be obtained through the SIP local survivable registration server when obtaining the SIP registration server of the central site fails. The IP address of the SIP registration server can be obtained without requiring the branch terminal to support the configuration of IP addresses of multiple SIP registration servers, and without increasing messages transferring between the branch device and the SIP registration servers of the central site, and between the branch device and the DNS server. Therefore, normal working of the branch terminal is ensured and costs are saved.

Figure 14:
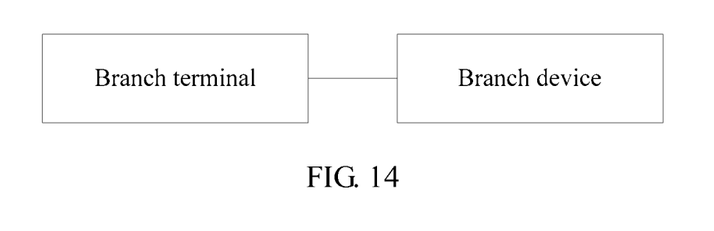
FIG. 14 is a schematic structural diagram of a network system according to an embodiment of the present invention.

FIG. 14 is a schematic structural diagram of a network system according to an embodiment of the present invention. As shown in FIG. 14, the network system is a network system of a branch office, and includes the branch device and branch terminal provided by the above embodiments.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the scope of the technical solutions of the embodiments of the present invention.

What is claimed is:

1. A method for obtaining an address of a session initiation protocol (SIP) registration server, the method applied in an enterprise or organization comprising a branch office and a central site, comprising:
   receiving, by a branch device comprising a processor in the branch office, a domain name system (DNS), resource record for specifying the location of service (SRV) query request sent by a branch terminal in the branch office during the branch terminal startup;
   forwarding, by the branch device, the DNS SRV query request to a DNS server in the central site, wherein the branch device is a SIP local survivable registration server providing registration service to the branch office when SIP registration server in the central site is not available and a DNS proxy responsible for implementing information transfer between the branch terminal and the DNS server;
   obtaining, by the branch device, a DNS SRV response message returned by the DNS server in response to the DNS SRV query request;
   adding information of the branch device to the DNS SRV response message; and
   returning the DNS SRV response message to which the information is added to the branch terminal in the branch office.

2. The method according to claim 1, wherein the information of the SIP local survivable registration server comprises a domain name of the SIP local survivable registration server, and wherein after the returning the DNS SRV response message to the branch terminal, the method further comprises:
   receiving, by the branch device, an A query message sent by the branch terminal, wherein the A query message comprises the domain name of the SIP local survivable registration server;
   obtaining the IP address of the SIP local survivable registration server according to the domain name of the SIP local survivable registration server; and
   returning the IP address of the SIP local survivable registration server to the branch terminal.

3. The method according to claim 2, wherein before the obtaining the IP address of the SIP local survivable registration server, the method further comprises:
   storing, by the branch device, correspondence between the domain name of the SIP local survivable registration server and the IP address of the SIP local survivable registration server.

4. The method according to claim 3, wherein the obtaining, by the branch device, the DNS SRV response message comprises:
   receiving, by the branch device, the DNS SRV response message returned by the DNS server, wherein the DNS SRV response message comprises an IP address of an SIP registration server of a central site to which the branch device belongs.

5. The method according to claim 4, wherein the DNS SRV response message further comprises a service type, a protocol type, and a domain where the SIP registration server of the central site is located; and
   wherein the adding information of the SIP local survivable registration server to the DNS SRV response message comprises:
      adding the information of the SIP local survivable registration server to the DNS SRV response message when the service type and the protocol type in the DNS SRV response message are the same as a service type and a protocol type of the SIP local survivable registration server and the domain where the SIP registration server of the central site is located in the DNS SRV response message is the same as a domain where the SIP local survivable registration server is located.

6. The method according to claim 3, wherein the obtaining, by the branch device, a DNS SRV response message comprises:
   constructing, by the branch device, the DNS SRV response message if a condition is met from the group consisting of:
      the branch device detects a link failure between the branch device and a DNS server and the branch device does not receive a response from the DNS server within a preset duration.

7. The method according to claim 2, wherein the obtaining, by the branch device, the DNS SRV response message comprises:
   receiving, by the branch device, the DNS SRV response message returned by a DNS server, wherein the DNS SRV response message comprises an IP address of an SIP registration server of a central site to which the branch device belongs.

8. The method according to claim 7, wherein: the DNS SRV response message further comprises a service type, a protocol type, and a domain where the SIP registration server of the central site is located; and the adding information of a SIP local survivable registration server to the DNS SRV response message comprises:
adding the information of the SIP local survivable registration server to the DNS SRV response message when the service type and the protocol type in the DNS SRV response message are the same as a service type and a protocol type of the SIP local survivable registration server and the domain where the SIP registration server of the central site is located in the DNS SRV response message is the same as a domain where the SIP local survivable registration server is located.

9. The method according to claim 1, wherein the obtaining, by the branch device, the DNS SRV response message comprises:
receiving, by the branch device, the DNS SRV response message returned by a DNS server, wherein the DNS SRV response message comprises an IP address of an SIP registration server of a central site to which the branch device belongs.

10. The method according to claim 1, wherein the obtaining, by the branch device, the DNS SRV response message comprises:
constructing, by the branch device, the DNS SRV response message if a condition is met from the group consisting of:
the branch device detects a link failure between the branch device and a DNS server and the branch device does not receive a response from the DNS server within a preset duration.

11. A branch device in a branch office, comprising a processor, and a memory coupled to the processor having multiple computer executable instructions stored thereon, when the executable instructions executed by the processor, cause the processor to:
receive a domain name system (DNS), resource record for specifying the location of service (SRV) query request sent by a branch terminal in the branch office during the branch terminal startup;
forward the DNS SRV query request to a DNS server in the central site, wherein the branch device is a SIP local survivable registration server providing registration service to the branch office when SIP registration server in the central site is not available and a DNS proxy responsible for implementing information transfer between the branch terminal and the DNS server;
obtain a domain name system DNS resource record for specifying the location of service (SRV) response message returned by the DNS server in response to the DNS SRV query request;
add information of the branch device to the DNS SRV response message; and
return the DNS SRV response message to which the information of the SIP local survivable registration server is added to a branch terminal in the branch office.

12. The branch device according claim 11, wherein the information of the SIP local survivable registration server comprises a domain name of the SIP local survivable registration server, the processor is further caused to:
receive an A query message sent by the branch terminal, where the A query message includes a domain name of the SIP local survivable registration server;
obtain a IP address of the SIP local survivable registration server according to the domain name of the SIP local survivable registration server; and
return the IP address of the SIP local survivable registration server to the branch terminal.

13. The branch device according to claim 12, the memory is further configured to store correspondence between the domain name of the SIP local survivable registration server and the IP address of the SIP local survivable registration server.

14. The branch device according to claim 11, wherein the information of the SIP local survivable registration server comprises a IP address of the SIP local survivable registration server, and the processor is caused to carry the IP address of the SIP local survivable registration server into the additional record part of the DNS SRV response message.

15. The branch device according to claim 11, wherein the DNS SRV response message further comprises a service type, a protocol type, and a domain where the SIP registration server of the central site is located, and the processor is caused to
add the information of the SIP local survivable registration server to the DNS SRV response message when the service type in the DNS SRV response message is the same as a service type of the SIP local survivable registration server, and the protocol type in the DNS SRV response message is the same as a protocol type of the SIP local survivable registration server, and the domain where the SIP registration server is located in the DNS SRV response message is the same as a domain where the SIP local survivable registration server is located.

16. The branch device according to claim 13, wherein the processor is caused to construct the DNS SRV response message if a condition is met from the group consisting of:
the branch device detects a link failure between the branch device and a DNS server and the branch device does not receive a response from the DNS server within a preset duration.

* * * * *